March 23, 1937.    L. RICEFIELD    2,074,939
COUPLING
Original Filed March 21, 1935
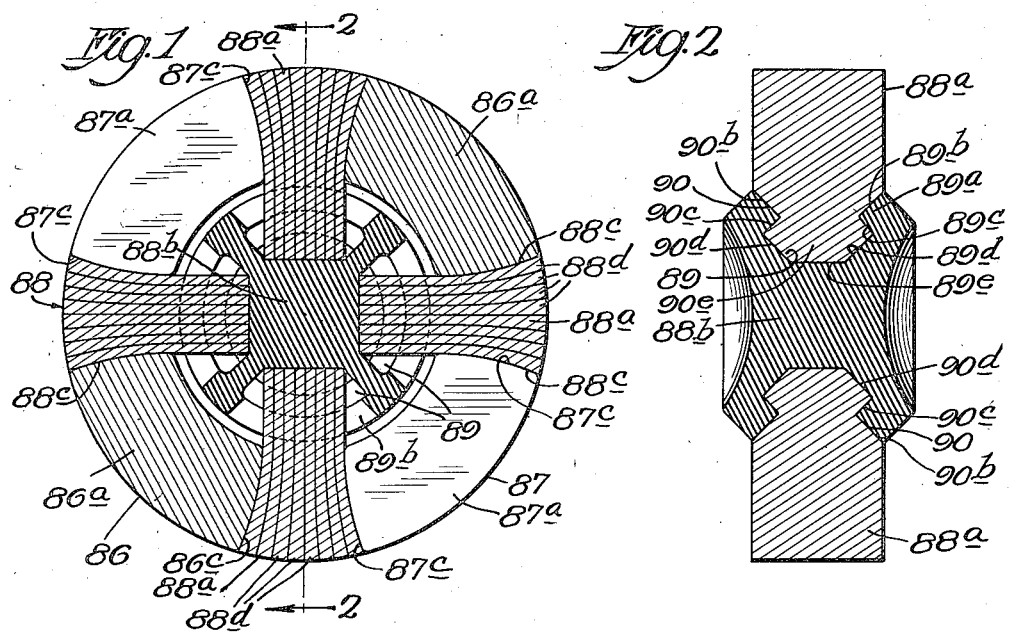
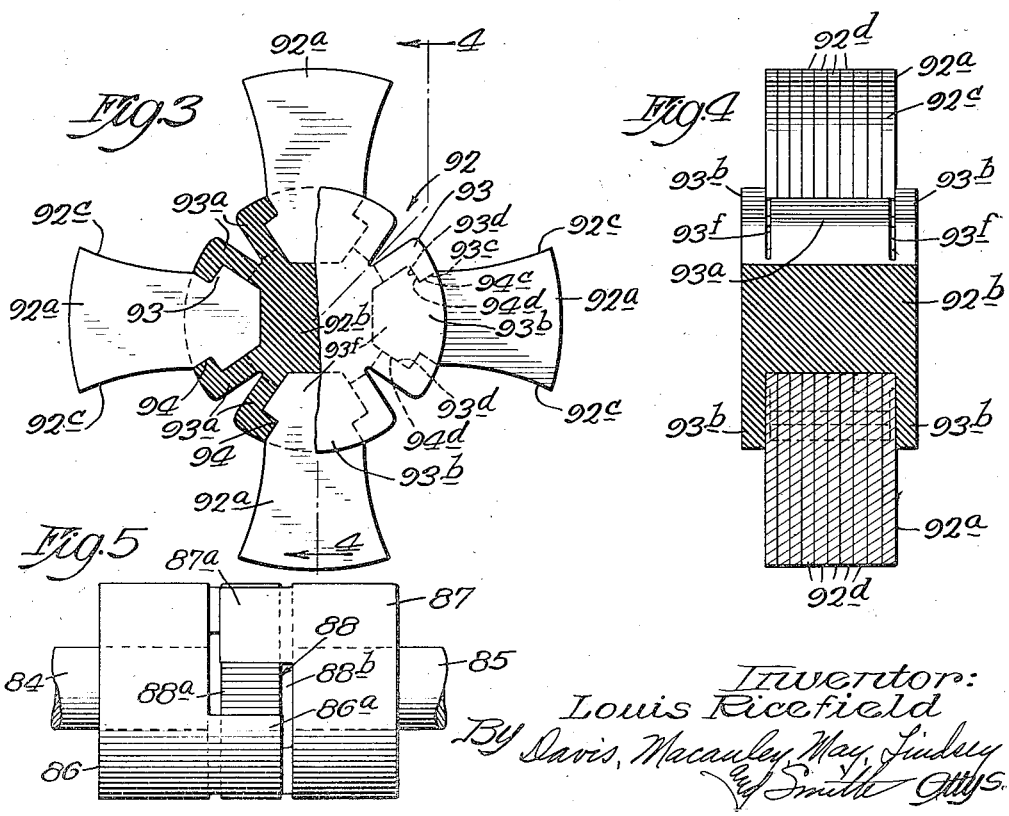
Inventor:
Louis Ricefield
By Davis, Macauley, May, Lindsey
& Smith Attys.

Patented Mar. 23, 1937

2,074,939

UNITED STATES PATENT OFFICE 2,074,939

COUPLING

Louis Ricefield, Oak Park, Ill.

Original application March 21, 1935, Serial No. 12,226. Divided and this application November 7, 1935, Serial No. 48,659

6 Claims. (Cl. 64—14)

This invention relates to improvements in couplings adapted for use in connecting substantially aligned shafts for the purpose of compensating for lateral displacement or angular misalignment of these shafts and also to permit relative longitudinal movement of the shafts during their rotation. The present application is a division of my co-pending application Serial No. 12,226, filed March 21, 1935. In said prior application, there is disclosed an improvement in couplings of the type in which a power transmitting spider is interposed between two coupling members each of which is secured upon one of the substantially aligned shafts, the spider having radiating arms formed of resilient material each of which extends between and contacts with two of the lugs or jaws which are carried by the coupling members and which extend longitudinally therefrom to intermesh loosely with each other. According to the invention disclosed in said application, the faces of each spider arm which engage the lugs or jaws of the coupling member converge outwardly from the hub of the spider to contact with similarly formed surfaces on the lugs or jaws so that equal forces of compression are set up in different parts of each spider arm when power is transmitted from one shaft to the other with the result that the wear is substantially uniform over all parts of each spider arm, thereby eliminating radially acting forces which tend to distort the spider arm or to effect relative movement of the parts thereof, with the result that the life of the spider is greatly increased as compared with spiders of the forms heretofore used. The principal object of the present invention is to provide an improved coupling of the type referred to in which the spider arms are capable of being readily detached from the hub of the spider. A further object of the invention is to provide an improved coupling comprising a spider having a hub and outwardly extending spider arms formed of laminations of resilient material which detachably interlock with parts of the hub. Still another object of the invention is to provide a spider for flexible couplings comprising a central hub having sockets in the outer portion thereof which are detachably engaged by the inner ends of outwardly extending spider arms adapted to contact with lugs or jaws carried by coupling members between which the spider is adapted to be mounted. Other objects relate to various features of construction and arrangement which will appear more fully hereinafter.

The nature of the invention will be understood from the following specification taken with the accompanying drawing, in which one embodiment is illustrated.

In the drawing,

Fig. 1 shows a central vertical section through an improved coupling embodying an improved spider constructed according to the present invention;

Fig. 2 is a vertical section taken through the spider only on the line 2—2 of Fig. 1;

Fig. 3 shows a partial side elevation and partial central vertical section through the spider of a modified form of the invention;

Fig. 4 shows a sectional view taken on the line 4—4 of Fig. 3; and

Fig. 5 is a side elevation of the complete coupling illustrated in Figs. 1 and 2.

In Figs. 1 and 2 of the drawing, there is illustrated an improved form of spider which may be employed as a part of a coupling, such as that shown in Figs. 1 and 5, in which a pair of coupling members 86 and 87 are adapted to be secured upon substantially aligned shafts 84 and 85, respectively, by means of keys, set screws and the like. These coupling members have longitudinally extending lugs or jaws $86^a$ and $87^a$ adapted to intermesh loosely with each other and to receive between them the radiating arms $88^a$ of a spider 88 which has a central hub $88^b$ located between the ends of the shafts on which the coupling members are secured. The spider arms $88^a$ have curved faces $88^c$ diverging outwardly which are adapted to coact with the diverging faces $86^c$ and $87^c$ of adjacent lugs of jaws carried by opposite coupling members. The surfaces of these spiders arms diverge outwardly from the inner edges of the lugs or jaws and coact with the similarly diverging surfaces on those members. Each spider arm $88^a$ is made up of a plurality of layers $88^d$ of leather, rubberized textile fabric or other compressible material suitable for the purpose which preferably has some resiliency and great wearing qualities. Where layers of leather, rubberized fabric or other materials are employed, these are cemented or otherwise secured together. The hub $88^b$ may be formed of vulcanized rubber or of spring steel or other flexible resilient material, and the connection of this hub with the spider arms $88^a$ is such that the spider arms may be readily detached and displaced without disassembling the parts of the coupling. The hub $88^b$ is provided with a series of pockets 89 each adapted to receive the inner end of one of the spider arms $88^a$. The lateral sides of these pockets are bounded by overhanging lips or flanges 89ᵃ provided on their outer sides with inwardly inclined surfaces 89ᵇ and on their inner sides with outwardly directed inclined surfaces 89ᶜ. From the lower extremities of the surfaces 89ᶜ, the walls of the pockets are inclined axially, as shown at 89ᵈ, terminating in the inner wall of the pocket 89ᵉ. The inner end portion of each spider arm is provided on opposite sides with notches 90 having surfaces 90ᵇ to contact with the surfaces 89ᵇ and having other surfaces 90ᶜ to contact with the surfaces 89ᶜ of the hub. Each spider arm is provided inwardly of the surfaces 90ᶜ with inwardly converging surfaces 90ᵈ which are adapted to contact with the surfaces 89ᵈ of the pocket and which have the same inclination as the surfaces 90ᵇ. The flanges 89ᵃ forming the lateral walls of each pocket have sufficient resiliency to permit them to be spread apart when the inclined surfaces 90ᵈ at the inner end of a spider arm are pressed against the inclined surfaces 89ᵇ at the outer edge of the pocket and the head 90ᵉ which is formed at the inner end of the spider arm by the provision of the notches 90 is thus permitted to snap past the flanges 89ᵃ of the pocket until the spider arm reaches the position shown in Fig. 2, where it is interlocked securely with the hub. When it is desired to remove the spider arm, an outward pull thereon will cause the surfaces 90ᶜ on the spider arm to force the flanges 89ᵃ of the pocket outwardly due to their coaction with the surfaces 89ᶜ, thereby permitting the spider arm to be removed and replaced readily by another after it has been worn without the necessity of removing any of the other spider arms or the hub from the assembled coupling.

In the form of construction shown in Figs. 1 and 2, the laminations of the spider arms are directed transversely to the directions in which forces are transmitted through the spider arms from one coupling member to the other but the same type of spider construction is capable of being employed where the laminations of the spider arms are directed edgewise to the jaws of the coupling members with which they contact, and one illustration of this adaptation of the invention is shown in Figs. 3 and 4, where a series of spider arms 92ᵃ is shown attached to a central hub 92ᵇ to form a complete spider 92. The arms 92ᵃ of the spider have outwardly diverging curved lateral faces 92ᶜ adapted to contact with the curved faces of intermeshing jaws on coupling members, such as those shown in Fig. 1, and these spider arms are preferably made up of parallel laminations 92ᵈ of leather, rubberized textile fabric or other compressible resilient material, with the laminations directed edgewise to the surfaces 92ᶜ which are adapted to contact with the coupling jaws. The hub 92ᵇ is preferably made up of rubber, steel or other material having sufficient resiliency to permit the spider arms to be snapped into place in the sockets of the hub and to be removed therefrom. The hub 92ᵇ comprises a central body having formed integrally therewith a series of radiating socket members 93 each having end flanges 93ᵃ which are adapted to interlock with the spider arms and lateral walls 93ᵇ which are adapted to engage the sides of the spider arms. The flanges 93ᵃ overhang the cavity of the socket 93 and are adapted to interlock with notches 94 which are formed in the edges of the inner portions of the spider arms. Each flange 93ᵃ has an inner inclined surface 93ᶜ adapted to contact with a surface 94ᶜ forming one of the walls of one of the notches in the coacting spider arm and the overhanging portions of the flanges are provided on their inner sides with outwardly directed inclined surfaces 93ᶜ which are adapted to contact with similar inclined surfaces 94ᶜ forming the inner wall of one of the notches 94. The inner end of each spider arm has inwardly converging surfaces 94ᵈ which are adapted to contact with the similarly inclined surfaces 93ᵈ formed in the pocket and each spider arm thus has an inner head 93 which is adapted to form an interlocking engagement with one of the sockets of the hub. In order to permit the necessary spreading of the flanges 93ᵃ at the ends of each socket, slots 93ᶠ are preferably provided at the ends of these flanges as shown in Fig. 4, this construction being particularly desirable when the hub is formed of metal.

In the construction of either of the forms of couplings described above, it is desirable to arrange the contacting surfaces of the spider arms and jaws so that their inclination to the radial center line of the spider arm will be less than the angle of friction which varies for the different materials which may be employed in the construction of the spider arms. By suitably proportioning the spider arms and providing their lug-engaging faces with outwardly diverging surfaces, the divergence of which depends upon the materials employed, the parts may be so proportioned as to maintain a substantially uniform degree of compression in all parts of each spider arm, with a resulting increase in the life of the spider, as more fully set forth in the original application above referred to, but it will be apparent that the features of the present invention according to which the spider arms are detachably mounted upon the hub of the spider may be employed in couplings of various types wherein the opposite lug-engaging faces of each spider arm are parallel to each other or are otherwise not so arranged as to obtain the advantage of uniform compression and uniform wear.

Although two forms of the invention have been shown and described by way of illustration, it will be understood that it may be constructed in various other embodiments coming within the scope of the appended claims.

I claim:

1. The combination in a coupling for connecting substantially aligned shafts, of a pair of coupling members adapted to be secured on one of said shafts, each of said coupling members having a plurality of longitudinally extending jaws adapted to intermesh loosely with the jaws carried by the other coupling member, and a power transmitting spider interposed between said coupling members and having a plurality of radiating arms of non-metallic resilient compressible material each adapted to extend between and contact with two of said jaws, said spider comprising a hub having sockets therein, said sockets and the inner ends of non-metallic portions of said spider arms having a yieldable interlocking engagement with each other.

2. The combination in a coupling for connecting substantially aligned shafts, of a pair of coupling members adapted to be secured on one of said shafts, each of said coupling members having a plurality of longitudinally extending jaws adapted to intermesh loosely with the jaws carried by the other coupling member, and a power transmitting spider interposed between said coupling members and having a plurality of radiating arms each adapted to extend between and contact with two of said jaws, said spider comprising a hub having a plurality of sockets therein, each of said sockets having resilient walls adapted to form a detachable interlocking engagement with one of said spider arms.

3. The combination in a coupling for connecting substantially aligned shafts, of a pair of coupling members adapted to be secured on one of said shafts, each of said coupling members having a plurality of longitudinally extending jaws adapted to intermesh loosely with the jaws carried by the other coupling member, and a power transmitting spider interposed between said coupling members and having a plurality of radiating arms each adapted to extend between and contact with two of said jaws, said spider comprising a hub having a plurality of sockets therein, each of said sockets having resilient walls adapted to form a detachable interlocking engagement with one of said spider arms, said spider arms having notches at their inner ends adapted to be detachably engaged by said resilient walls.

4. The combination in a coupling for connecting substantially aligned shafts, of a pair of coupling members adapted to be secured on one of said shafts, each of said coupling members having a plurality of longitudinally extending jaws adapted to intermesh loosely with the jaws carried by the other coupling member, and a power transmitting spider interposed between said coupling members and having a plurality of radiating arms each adapted to extend between and contact with two of said jaws, said spider comprising a hub having a plurality of sockets adapted to receive the inner ends of said spider arms, each of said sockets having oppositely disposed resilient parts provided with outwardly converging and inwardly converging inclined surfaces, each of said spider arms having V-shaped notches at their inner ends and inwardly converging end surfaces, whereby each of said spider arms may be snapped into interlocking engagement with the resilient parts of one of said sockets and removed therefrom by an outward pull.

5. The combination in a coupling for connecting substantially aligned shafts, of a pair of coupling members adapted to be secured on one of said shafts, each of said coupling members having a plurality of longitudinally extending jaws adapted to intermesh loosely with the jaws carried by the other coupling member, and a power transmitting spider interposed between said coupling members and having a plurality of radiating arms each adapted to extend between and contact with two of said jaws, said spider comprising a hub having a plurality of sockets adapted to receive the inner ends of said spider arms, each of said sockets having oppositely disposed resilient parts provided with outwardly converging and inwardly converging inclined surfaces, each of said spider arms having V-shaped notches at their inner ends and inwardly converging end surfaces, whereby each of said spider arms may be snapped into interlocking engagement with the resilient parts of one of said sockets and removed therefrom by an outward pull, each of said spider arms being made up of parallel laminations which extend transversely to the direction of said notches formed therein.

6. The combination in a coupling for connecting substantially aligned shafts, of a pair of coupling members adapted to be secured on one of said shafts, each of said coupling members having a plurality of longitudinally extending jaws adapted to intermesh loosely with the jaws carried by the other coupling member, and a power transmitting spider interposed between said coupling members and having a plurality of radiating arms each adapted to extend between and contact with two of said jaws, said spider comprising a hub having sockets adapted to be engaged by the inner ends of said spider arms, the walls of said sockets being of resilient material and said walls and said spider arms having interlocking parts adapted to permit each of said spider arms to be snapped into interlocking engagement with the resilient parts of said hub by radial inward movement thereof, and adapted to permit removal of said arms by radial outward movement thereof.

LOUIS RICEFIELD.